No. 739,372. PATENTED SEPT. 22, 1903.
S. L. ALLEN.
CULTIVATOR.
APPLICATION FILED JAN. 14, 1902.
NO MODEL. 4 SHEETS—SHEET 1.

Witnesses.

Inventor,
Samuel L. Allen,
by Horace Pettit
his Attorney.

THE NORRIS PETERS CO., PHOTO-LITHO., WASHINGTON, D. C.

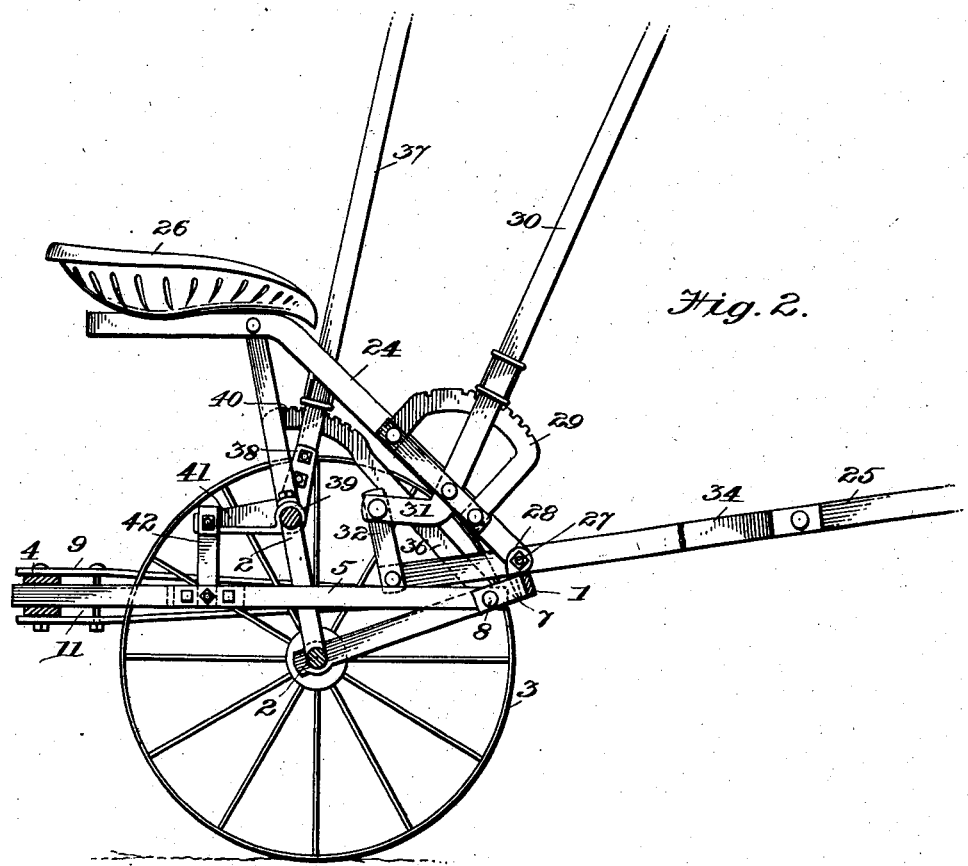

No. 739,372. PATENTED SEPT. 22, 1903.
S. L. ALLEN.
CULTIVATOR.
APPLICATION FILED JAN. 14, 1902.
NO MODEL. 4 SHEETS—SHEET 3.

Witnesses.
Jno. T. Cross.
Chas. K. Bennett.

Inventor;
Samuel L. Allen,
by Horace Petit
his Attorney.

No. 739,372. PATENTED SEPT. 22, 1903.
S. L. ALLEN.
CULTIVATOR.
APPLICATION FILED JAN. 14, 1902.
NO MODEL. 4 SHEETS—SHEET 4.
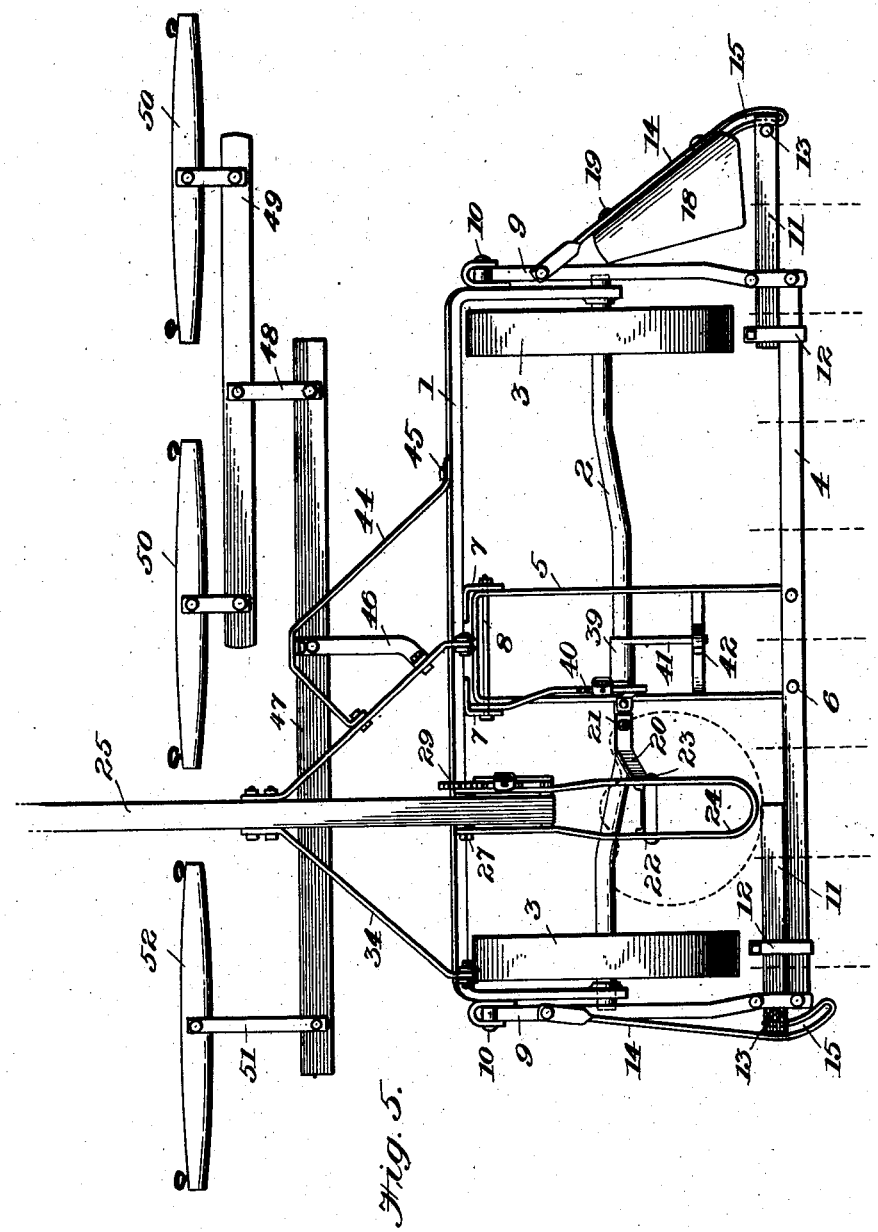
Witnesses.
Inventor,
Samuel L. Allen,
by Horace Pettit
Attorney.

No. 739,372. Patented September 22, 1903.

UNITED STATES PATENT OFFICE.

SAMUEL L. ALLEN, OF MOORESTOWN, NEW JERSEY.

CULTIVATOR.

SPECIFICATION forming part of Letters Patent No. 739,372, dated September 22, 1903.

Application filed January 14, 1902. Serial No. 89,667. (No model.)

*To all whom it may concern:*

Be it known that I, SAMUEL L. ALLEN, a citizen of the United States, and a resident of Moorestown, State of New Jersey, have invented certain new and useful Improvements in Cultivators, of which the following is a full, clear, and exact description, reference being had to the accompanying drawings, forming part of this specification.

This invention has particular reference to an improved cultivator, such as is designated by me in commercial circles as an "orchard-cultivator," its construction and arrangement being particularly adapted to the cultivation of fields where trees are numerous and where consequently overhanging branches and roots are to be avoided, so as to prevent possibility of injury to them during the working of the machine.

The object of my invention is, therefore, to provide a machine for the cultivation of soils which is particularly adapted to orchards, said machine being so constructed as to work close to the trees without bringing any parts of the mechanism in contact with the overhanging branches, and, further, in providing an adjusting means which will operate to produce a more shallow cut on that side of the machine in closest proximity to the trees, and thus obviate the danger of injuring the roots of such trees.

Further objects of my invention are to provide means for adjusting the width of the machine, which may be effected from either side of the machine, so that the cutting implements may be extended under the branches of the tree so as to cut close to said tree.

Still further objects, uses, and advantages will be brought out on reference to the following description and drawings, forming part of this specification.

Figure 1:
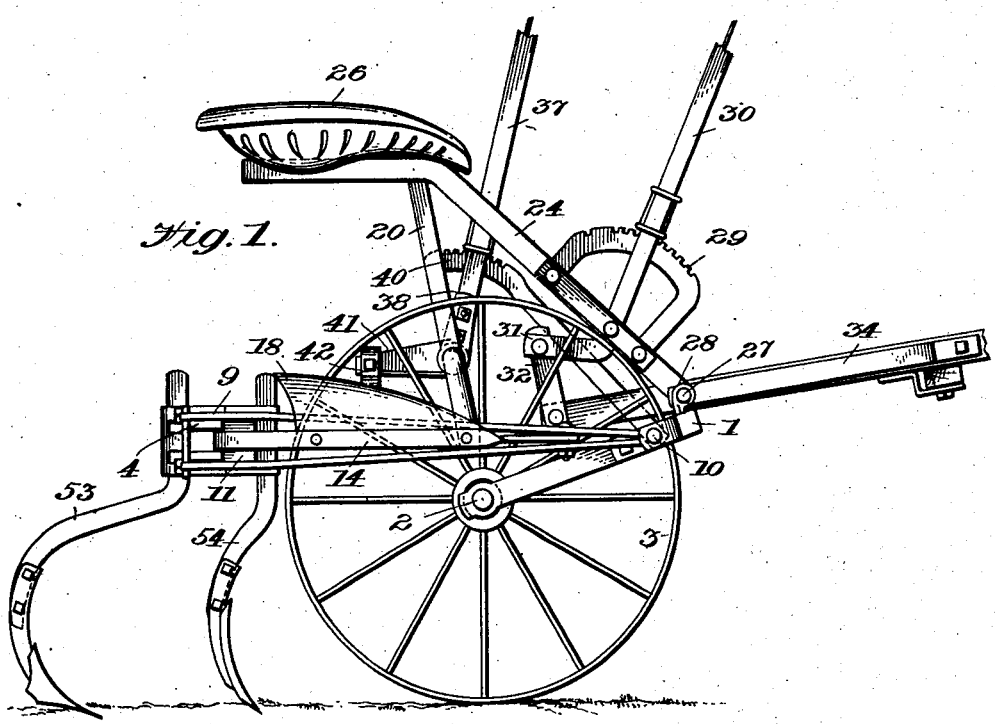
Figure 4:
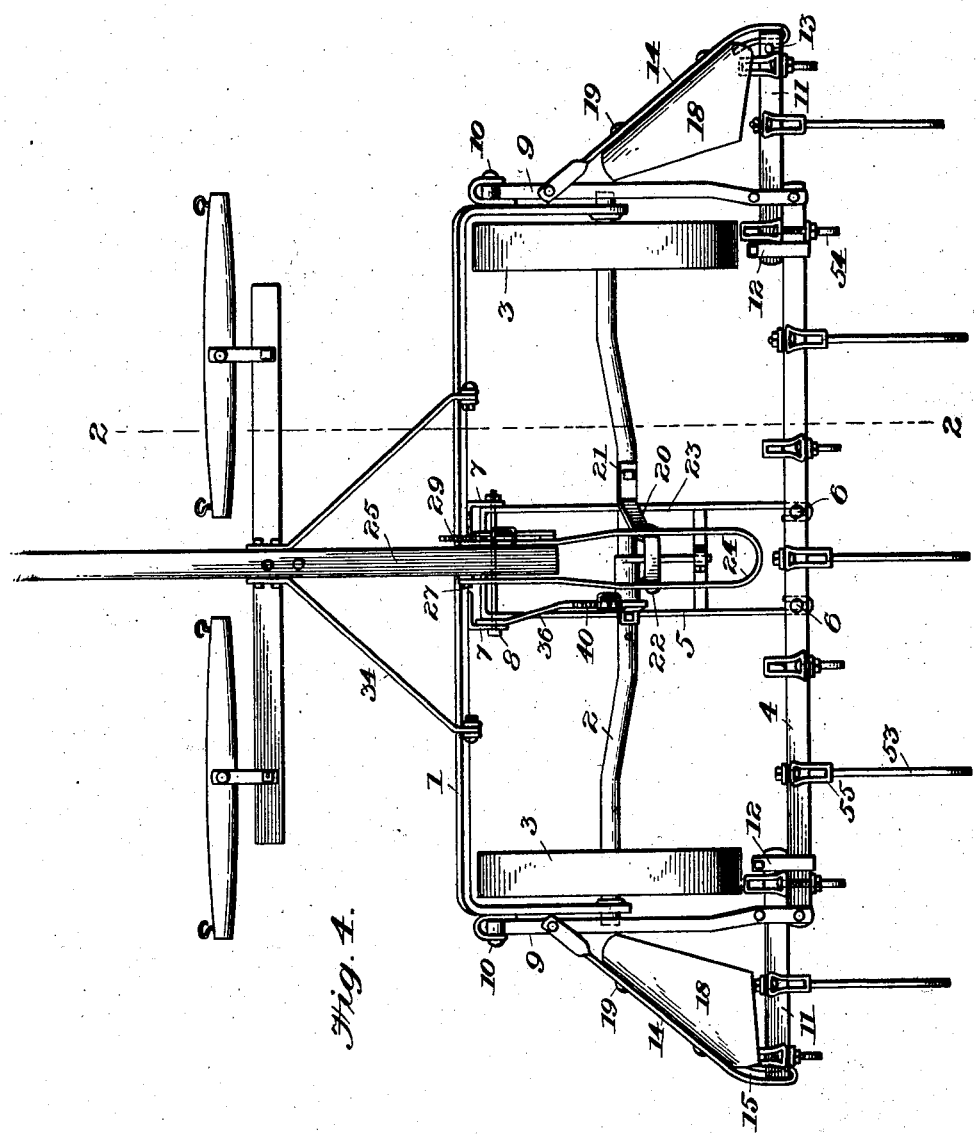

Referring particularly to the drawings, Figure 1 is a side elevation of a machine constructed in accordance with my invention. Fig. 2 is a sectional elevation of the same, taken about on the line 2 2 of Fig. 4. Fig. 3 is a detail front elevation, the tongue of the machine being shown in section. Fig. 4 is a plan view of my machine, showing the tool-carrying frames extended at both ends. Fig. 5 is a view similar to Fig. 4 with one of the adjustable arms at one side of the machine moved inwardly to shorten the width of the said machine, also illustrating a draft arrangement for use with three horses.

In carrying out my invention I provide a main supporting-frame comprising an arched frame bar 1, having its free ends pivoted to the supporting-axle 2, which carries the supporting-wheels 3.

The tool-carrying frame comprises a pair of intermediate parallel bars 4, arranged one above the other, which are connected to and rigidly held to the arch-frame 1 by means of the rectangular frame 5, which is connected to the said intermediate frame by means of the bolts 6. This rectangular frame 5 is pivotally connected to the arch-frame 1 by means of the angle-bars 7 and the pivot-pin 8, which passes through said angle-bars and through the rectangular frame 5.

At each end of the tool-carrying frames 6 are secured, by means of suitable bolts, the brace-rods 9, the forward ends of said brace-rods being pivotally secured to the arch-frame 1 by means of the pivot-bolts 10. These brace-rods 9 are preferably made of steel bars bent together at their forward ends to form an eye, through which the pivot-bolts 10 pass and continuing rearwardly to the end of the tool-carrying frame, thus forming twin bars having their free ends bolted to the ends of the intermediate tool-carrying frame on each side thereof.

Figure 6:
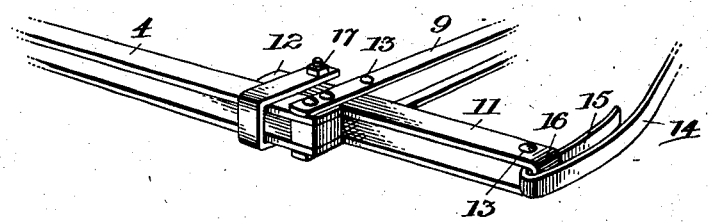

Directly back of the intermediate tool-carrying frames are the parallel extension-frames 11, located at each side of the machine, comprising parallel bars which are similar to the bars 4, but of much shorter length, as illustrated in Figs. 4 and 5 of the drawings. These extension tool-carrying frames are supported by means of the clamps 12 at the inner ends thereof, which hold them to the bars 4, and also by passing between the twin bars 9, located at each side of the machine. A bolt 13 passes through the twin bars 9, which impinges against the front edge of the extension-bars 11 for more firmly holding and guiding these bars during their lateral adjustment. Pivoted to each of the side bars 9 are the side arms 14, these arms being provided with curved ends, which are bent backwardly in a parallel curve to form a loop 15, which loop embraces the closed end 16 of the bars 11 in the manner illustrated in detail in Fig. 6 of the drawings. A bolt 13 is passed vertically through the two bars 11 adjacent to the curved tongue which forms the loop 15, the said bolt impinging against this tongue and serving to hold this end of the arm 14 more firmly to the frame 11. By loosening up the clamping-bolt 17, carried by the clamp 12, the arm 14 can be moved inwardly, thereby pushing the frame-bars 11 inwardly along the front edge of the intermediate bars 4, and when the desired adjustment is obtained these bars 11 can again be clamped through the medium of the clamping-bolt 17. The arm 14 at the opposite side of the machine can be adjusted in the same manner, and either arm can be adjusted independently of the other. This construction enables the tool-carrying frame to be extended, so as to bring the tools a farther distance under the trees, if it may be desired, or if the machine be working in an open field serves as a medium for widening the said machine.

Attached to each of the side arms 14 are the sheet-metal fenders 18, which are secured to said side arms by means of suitable bolts 19. These fenders curve upwardly to the tops of the tool-standards, as illustrated in Fig. 1, and serve to prevent any leaves or very low branches of the trees from becoming tangled up in the machine or injured.

The supporting-axle of the machine 2 is bent upwardly, forming an arch at its central portion, as most clearly illustrated in Fig. 3 of the drawings, and the seat-frame 20 is secured to the arched part of the axle, as also illustrated in Fig. 3. The bar 20 is provided on its lower end with a foot, which is pivoted by means of the bolt 21 to the said axle 2. This bar at its upper end is bent in a horizontal plane and bolted by means of the bolts 22 and 23 to the seat-frame 24. This frame 24 is pivotally connected at its lower end to the arched frame 1 and the tongue 25. The upper portion of the frame 24 is bent in a substantially horizontal plane and forms a support for the seat 26. The lower ends of the frame-bars 24 are connected to the tongue 25 by means of a pivot-pin 27, which passes through said bars and through the projecting ears 28, which are carried by the frame 1, thus making a pivotal connection at this point for the tongue.

On the side of one of the bars forming the seat-frame 24 is a segmental rack 29, provided with an operating-lever 30, which is pivoted to the frame 24 and has an angularly-disposed end 31, which is connected by means of a link 32 to the end of the tongue 25. The lever 30 is provided with the usual spring-pawl, which engages the teeth of the rack 29. It will thus be seen that by operating the lever 30 the angle of the tongue may be regulated to suit the character of the team used for pulling the machine.

In Fig. 4 of the drawings the tongue and seat-frame are located in the center of the machine; but when working the soil close up to trees it is often desirable to bring the position of the driver to one side of the machine, so that he will be out of the way of the overhanging branches. This is accomplished simply by removing the bolt 21, which secures the bar 20 to the axle 2, and also removing the bolts 33, which secure the clips or ears 28 to the frame 1, thereby freeing the tongue and seat-bars 24 from the main frame of the machine and enabling these parts to be moved to one side of the machine, as illustrated in plan view in Fig. 5 of the drawings. The seat-support 20 can be bolted to the axle - tool through an aperture provided in said axle at the proper place in such a manner as illustrated in dotted lines in Fig. 3 of the drawings. The clips 28, which carry the lower ends of the bars 24, can then be secured to the frame 1 by means of bolts which pass through apertures provided in said frame at the proper point for this purpose. The brace-rods 34, which connect at one end to the arch-frame 1 and at their outer ends to the tongue 25, will of course have to be secured after the removal of the tongue to change its position to suitable clips located in the proper places on the frame 1. By changing the position of the seat-frame and tongue the weight of the driver is transferred from the center to one side of the machine, which will tend to throw the teeth on that side deeper into the ground, while the side nearest to the trees will be raised slightly, and thus make a more shallow cut, which is desirable when passing over the roots of such trees. By reason of the construction described this change can be effected very easily and in a very short space of time, it being only necessary to remove four bolts, as before described.

An inclined bar 36 is pivoted at its lower end to the frame 5, between the angle-iron 7 and one side of said frame, having its upper end shaped to form a segmental rack, the lower foot of which is bolted to the axle 2, as shown in Figs. 2 and 3. An operating-lever 37 is provided, having its lower end secured to an arm 38, formed on a sleeve 39, which is carried by the axle 2. This lever 37 is provided with a spring-pawl of the usual construction for engaging the teeth of the rack 40, by means of which the said lever may be locked in its adjusted position. Extending from the sleeve 39 at an angle to the arm 38 is an arm 41, which is pivoted at its free end to a brace-rod 42, rigidly secured to the frame-bars 5. By the operation of the lever 37 the tool-carrying frames can be raised or lowered for the purpose of regulating the depth of the cut of the tools in the soil and also for the purpose of raising the tools entirely clear of the ground for transportation purposes.

When it is desired to use three horses for drawing the machine, the tongue 25 is shifted to one side of the machine in the manner heretofore described and as illustrated in Fig. 5 of the drawings. I then employ an angular brace-rod 44, of the shape substantially as shown in Fig. 5, having one end secured at 45 to the arch-frame 1 and its other end secured to the central portion of the brace 34. A rod or bar 46 is bolted to the horizontal portion of the brace-rod 44 at one end and to the rear portion of the brace 34 at its other end. To this bar 46 is pivoted the draft-beam 47, and from the right-hand side of the said beam 47 is connected, by means of a pivoted link 48, a beam 49, to which are properly connected the doubletrees 50. Adjacent to the other end of the beam 47 is pivoted a link 51, somewhat longer than the link 48, to the front end of which is suitably connected the swingletree 52, which is substantially in line with the doubletrees 50. By this arrangement the draft is equalized, and such an arrangement is preferably used when working in an open field and with the tool-carrying frames adjusted to their full width.

The cultivating-tools are carried by the standards 53 54, which are secured to the tool-carrying frames 4 and 11 by means of suitable clamps, as 55, or by any other suitable means. These tool-standards can be adjusted on the tool-carrying bars constituting the frame in the proper positions to suit the character of the work to be performed.

The advantages of the removable tongue and seat-frame will be readily apparent by reference to the foregoing description, and in such description it will be noted that the operating-lever and its segmental rack by which the height of the tongue is adjusted is secured to and carried by the seat-frame, so that when the said frame and tongue are adjusted to one side of the machine the operating-lever goes with them and is consequently within easy reach of the operator and could be operated with his left hand, while the lever 37 is within easy reach of the right hand. This arrangement is a material advantage for these reasons.

The pivoted side arms 14 are also an important feature of this invention, as they serve not only as fenders, but also prevent the extended tool-carrying frames 11 from being twisted or strained when the cultivator-teeth are working in the soil. They also serve as an easy means for sliding in the extension-arms 11 when it is desired to decrease the width of the tool-carrying frame, all of which has been mentioned hereinbefore.

By constructing a machine of this character in the manner heretofore described I have greatly simplified its construction, and thereby cheapened its cost of manufacture, which is a most important feature in this art. I have also increased the efficiency and at the same time added to the strength and enlarged the working capacity of such machines.

Various minor changes in details and proportions might be made in the machine as illustrated and described without departing from the spirit and scope of my invention, and what I claim as novel will be particularly pointed out in the claims made hereto.

Having thus described my invention, what I claim, and desire to secure by Letters Patent, is—

1. In a cultivator, the combination of a main supporting-frame and axle, a tool-carrying frame pivotally supported on the main frame, a seat-frame pivoted above said main frame and having a support removably secured to the machine-axle, and a pivotal connection between said seat-frame and the main supporting-frame, for the purpose described.

2. The combination of a main supporting-frame, a tool-carrying frame supported thereon, a tongue removably secured to the main frame, a seat-frame pivoted to said tongue, and a supporting-frame rigidly secured to the seat-frame at its upper end and removably secured to the axle of the machine at its lower end, substantially as described.

3. The combination with the supporting-frame and axle, a tongue removably secured to the main supporting-frame, a seat-frame secured at one end to the tongue, a brace for said seat-frame rigidly secured thereto and removably secured to the axle of the machine, and an operating-lever carried by the seat-frame adapted to raise or lower the tongue, substantially as described.

4. The combination with the axle and its supporting-wheels, of an arch-frame having its free ends pivotally mounted on the machine-axle, a tool-carrying frame in rear of the wheels, side bars rigidly secured to the tool-carrying frame and pivoted at their forward ends to the outside of the arms of the arch-frame in front of its connection with the axle, substantially as described.

5. The combination of a main supporting-frame pivotally mounted on the axle of the machine, tool-carrying frames located in rear of the supporting-wheels, side bars secured to the tool-carrying frames and pivotally connected to the main supporting-frame, a central frame rigidly secured to the tool-carrying frame and pivotally secured to the main supporting-frame at its front end, and means for raising and lowering the said tool-carrying frame, substantially as described.

6. The combination of an arched frame having its free ends pivotally mounted on the axle of the machine, tool-carrying frames located in rear of the supporting-wheels, side bars secured to the tool-carrying frames and pivotally connected at their front ends to the arched frame, a centrally-disposed frame rigidly secured to the tool-carrying frame and pivotally connected to the arch-frame, a tongue-frame pivotally connected to the arch-frame, a seat-frame pivoted at its front end to the tongue, and a supporting-bar for said frame rigidly secured to the intermediate section of the same and having its lower end secured to the axle of the machine, substantially as described.

7. The combination with the machine-axle and its supporting-wheel, of an arched frame pivotally secured to said axle, tool-carrying frames comprising an intermediate section and two end sections parallel with and supported by the said intermediate section adapted to be adjusted laterally, side bars pivotally connected to the arch-frame at their front ends and secured to the tool-carrying frames at their rear ends, and side arms pivoted to the said side bars having their free ends loosely connected to the extension-bars of the tool-carrying frame, substantially as described.

8. The combination with the main supporting-frame, of a tool-carrying frame comprising an intermediate section and two end sections parallel with the said intermediate section, twin side bars having their rear ends rigidly secured to the intermediate section and embracing the upper and lower surfaces of the end sections and having their forward ends pivotally connected to the main supporting-frame, side arms pivoted to the side bars, loops formed on the free ends of said side arms, a loose connection between said loops and the end sections of the tool-carrying frame, whereby the said end sections may be adjusted laterally to increase or diminish the width of the machine.

9. The combination with the main supporting-frame of a tool-carrying frame comprising an intermediate section supported by the main frame, end sections parallel with said intermediate sections and supported thereby, pivoted arms connecting the machine-frame with the said end sections, and fenders carried by said arms for the purpose substantially as described.

10. The combination with the machine-axle and its supporting-wheels, of an arched frame having its free ends pivoted to the said axle, tool-carrying frames pivotally supported on the main frame, an intermediate frame rigidly secured to the tool-carrying frame and pivotally connected to the arch-frame, an inclined bar pivoted at its front end to the main frame and rigidly secured at its rear end to the machine-axle, a segmental rack formed on said inclined bar, an operating-lever fulcrumed on the machine-axle having a pawl mechanism adapted to engage the tooth of the rack, an angularly-disposed arm rigidly carried by the axle and a connection between said arm and the tool-carrying frame whereby upon the operation of the lever the said tool-carrying frame may be adjusted to regulate the depth of the cut.

11. The combination with the main supporting-frame of a tongue pivoted to the front bar of said frame, a seat-frame rearwardly inclined having its front ends secured to the tongue-pivot, a rigid brace-rod secured to the machine-axle and to the intermediate portion of the seat-frame, a segmental rack carried by the seat-frame an operating-lever fulcrumed on the seat-frame adapted to engage the said rack, an angularly-disposed arm on the end of the operating-lever and a connecting-link between the ends of said arms and the end of the tongue for the purpose substantially as described.

12. The combination with the axle and its supporting-wheels of an arched frame pivotally mounted on said axle, a tool-carrying frame located in rear of the supporting-wheel and pivotally connected to the arch-frame, a segmental rack rigidly secured at one end to the machine-axle and pivotally connected at its other end to the arch-frame, an operating-lever fulcrumed on the machine-axle adapted to engage the segmental rack, connections between the said operating-lever and the pivoted tool-carrying frame, a tongue pivoted to the arch-frame, a seat-frame secured to the tongue-pivot having its rear end rigidly braced to the machine-axle, an operating-lever connected to the rear end of the tongue and a segmental rack-and-pawl mechanism for said operating-lever, substantially as described.

13. The combination with the arch-frame, of a removable tongue and seat-frame, angular braces for securing said tongue to the arch-frame, a supplemental brace secured to one of said tongue-braces and to the arch-frame, and a draft-equalizing bar pivoted to said supplemental brace, substantially as described.

14. The combination with the arch-frame, of a removable tongue and seat-frame, angular braces for securing said tongue to the arch-frame, a supplemental brace secured to one of said tongue-braces and to the arch-frame, a draft-equalizing bar pivoted to said supplemental brace, a doubletree secured to said draft-bar on one side of the tongue and a swingletree secured to the same on the other side of the tongue, substantially as described.

In witness whereof I have hereunto set my hand this 9th day of January, A. D. 1902.

SAMUEL L. ALLEN.

Witnesses:
ARTHUR E. NITZSCHE,
JNO. T. CROSS.